United States Patent [19]

Kuck et al.

[11] 4,299,806

[45] Nov. 10, 1981

[54] DECOLORIZATION OF ELEMENTAL YELLOW PHOSPHORUS

[75] Inventors: Mark A. Kuck, Upper Montclair, N.J.; Gary K. Miller, Portchester, N.Y.

[73] Assignee: Stauffer Chemical Company, Westport, Conn.

[21] Appl. No.: 220,882

[22] Filed: Dec. 29, 1980

[51] Int. Cl.$^3$ ........................................... C01B 25/047
[52] U.S. Cl. .................................... 423/322; 210/772
[58] Field of Search ................ 423/322, 321 R, 321 S; 210/772

[56] References Cited

U.S. PATENT DOCUMENTS 2,123,554  7/1938  Klosky ............................... 423/322

FOREIGN PATENT DOCUMENTS 1203350  2/1970  United Kingdom ................ 423/322

Primary Examiner—O. R. Vertiz
Assistant Examiner—Margaret Medley
Attorney, Agent, or Firm—Vivienne T. White

[57] ABSTRACT

The invention is a process for purifying elemental yellow phosphorus by contacting the yellow phosphorus with an aliphatic alcohol-tetraalkyl ammonium halide solution which effectively removes impurities and produces a colorless product.

8 Claims, No Drawings

4,299,806

DECOLORIZATION OF ELEMENTAL YELLOW PHOSPHORUS

FIELD OF THE INVENTION

The invention relates to the purification of elemental yellow phosphorus (a/k/a white phosphorus).

RELEVANT ART

Elemental yellow phosphorus, which is produced from crude phosphate by electrothermal means, is generally found to contain arsenic and/or organic contaminants, generally polynuclear aromatics in varying amounts, which accounts somewhat for its yellow appearance. These impurities are undesirable because they are often found to restrict the uses of secondary phosphorus products, e.g., phosphoric acid salts. Yellow phosphorus is one of several allotropic forms of phosphorus. The material, when pure, is colorless or white in appearance.

It is known that elementary yellow phosphorus is a useful starting material for the manufacture of phosphorus derivatives, such as $P_2S_5$, for example. To this end, it is often necessary to first free the phosphorus from contaminants contained therein. The purification of phosphorus by subjecting it to treatment with concentrated sulfuric acid in a reactor has been described. Sometimes, however, the reactor may be found to show the phenomenon of local overheating. This in turn may initiate self-ignition of the phosphorus and culminate in fire outbreaks and explosions.

It is also known that yellow phosphorus can be purified by treating the phosphorus with between 0.5 and 5 weight percent of an aqueous suspension of activated carbon.

It has also been disclosed that phosphorus can be purified by subjecting it to treatment with polyphosphoric acid and activated carbon or with a mixture of active carbon and bleaching earth with the resulting formation of phosphorus containing 0.005% of inorganic contaminants and between 0.009 and 0.01% of organic contaminants. It has further been disclosed to purify yellow phosphorus with from 0.5 to 5 weight percent of an aqueous suspension of activated carbon containing between 50 and 500 kg/cubic meter of activated carbon.

SUMMARY OF THE INVENTION

A novel process of purifying crude yellow phosphorus has been found. The process is particularly suitable to decolorizing crude yellow phosphorus containing organic contaminants or "color bodies" comprised of polynuclear aromatics.

The process comprises contacting crude yellow appearing phosphorus with a decolorizing solution comprised of a tetraalkyl ammonium halide in an aliphatic alcohol, preferably a tetramethyl ammonium chloride-ethanol solution. The applicable alkyl range is from $C_1$–$C_5$ with a $C_1$–$C_2$ range being preferred. Suitable alcohols can range from $C_1$–$C_5$ with a $C_1$–$C_3$ range being preferred.

DETAILED DESCRIPTION OF THE INVENTION

The invention is a process for purifying crude yellow phosphorus. In the process, colored yellow phosphorus is treated with a tetraalkyl ammonium halide in an alcohol solution having the formula $(R)_4NX\cdot R'OH$ wherein R is an aliphatic alkyl group with a $C_1$–$C_5$ carbon range, R' is a $C_1$–$C_5$ aliphatic alcohol, and X is a halide, preferably chlorine. In the preferred practice of the invention the tetraalkyl ammonium halide, preferably a tetramethyl ammonium chloride, is dissolved in the aliphatic alcohol to produce an effective decolorizing solution for purifying yellow phosphorus. Treating the crude yellow appearing phosphorus with the decolorizing alcohol solution as disclosed herein removes the color bodies contained in the yellow phosphorus and yields the colorless appearing product.

Phosphorus obtained from a variety of sources contains varying amounts of impurities depending on the source. It is, therefore, not the intention to limit the invention to any specific concentration of the tetramethyl ammonium halide-alcohol solution disclosed herein for decolorizing crude yellow phosphorus. Suitable concentration limits for practicing the invention are instead dependent on the solubility of the tetraalkyl ammonium halide in the specific alcohol selected, and the temperature at which the decolorizing process is conducted.

In the practice of the invention, crude yellow phosphorus, either in a molten or solid state, is mixed with the solution for a period of time of from about 4—10 hours, generally about 6 hours at a temperature above the melting point of phosphorus. It is generally desirable to contact the yellow phosphorus with the alcohol-tetraalkyl ammonium halide solution in a weight ratio of about 1:4 although it is not the intention to limit the practice of the invention to any specific ratio of decolorizing solution to phosphorus.

In general, the process can be conducted at a temperature ranging from about 44° to about 120° C. The desirable temperature range is from about 45° C., or just above the melting point of phosphorus, to about 90° C. with a preferred temperature being about 55° C. It is within the knowledge of one having ordinary skill in the art to determine without undue experimentation the specific electrolyte and concentration thereof for treating yellow phosphorus from varying sources.

Solubility data cited below in Table 1 is indicative of the solubility of tetramethyl ammonium chloride in some of the $C_1$–$C_5$ aliphatic alcohols disclosed herein for use in preparing the decolorizing solution. Since the solubility of $R_4NCL$ increases with temperature, at higher temperatures higher electrolyte concentrations can be obtained.

It is not necessary to utilize anhydrous alcohol in practicing the invention since some water is generally introduced into the decolorizing solution with the phosphorus which is generally stored under water.

TABLE 1

| Aliphatic Alcohol | b.p, °C. | Temperature °C. | Solubility Wt. % |
|---|---|---|---|
| Methanol | 65 | 55 | 43.9 |
| Ethanol | 78.5 | 55 | 19.4 |
| n-propanol | 97.1 | 55 | 10.7 |
| Isopropanol | 82.4 | 55 | 5.7 |
| n-butanol | 118 | 55 | 5.7 |
| n-pentanol | 136 | 55 | <5.7 |

The following Examples are illustrative of the novel process of decolorizing or purifying elemental yellow phosphorus disclosed herein.

EXAMPLE I

Crude yellow phosphorus samples from sources listed below in Table II were treated by mixing the crude phosphorus with a tetramethyl ammonium chloride-absolute ethanol solution in a weight ratio of about 1:4 at 55° C. over a period of 6 hours. The mixtures were allowed to cool to ambient temperature and the alcohol solutions were removed by decantation. The solid phosphorus was washed twice with anhydrous ethanol. The following results were obtained.

TABLE II

| Crude $P_4$ Source | Wt. % Concentration of $(CH_3)_4NCl$ in $C_2H_5OH$ | Residence Time at 55° C. (hrs.) | $P_4$ Appearance |
|---|---|---|---|
| Cheminova | 5.7 | 6 | Colorless |
| J. T. Baker | 8.4 | 6 | Colorless |

EXAMPLE II

The alcohol solution recovered after treating and decolorizing the Cheminova $P_4$ sample of Example I was analyzed by gas chromatography and mass spectroscopy and was found to contain polynuclear aromatics such as anthracene and or phenanthrene, fluoroanthene, pyrene and fluorene.

What is claimed is:

1. A process of purifying elemental yellow phosphorus to obtain a colorless appearing phosphorus which comprises contacting yellow phosphorus with a solution comprised of a tetraalkyl ammonium halide in aliphatic alcohol.

2. The process of claim 1 wherein the applicable carbon alkyl range is $C_1$–$C_5$.

3. The process of claim 2 wherein the tetraalkyl ammonium halide has a $C_1$–$C_3$ alkyl range.

4. The process of claim 3 wherein the decolorizing solution is comprised of tetramethyl ammonium chloride in an aliphatic alcohol.

5. The process of claim 1 wherein the anhydrous alcohol is a $C_1$–$C_5$ aliphatic alcohol.

6. The process of claim 5 wherein the alcohol is a $C_1$–$C_3$ aliphatic alcohol.

7. The process of claim 6 wherein the alcohol is absolute ethanol.

8. The process of claim 1 wherein the yellow phosphorus is contacted with the decolorizing solution in a weight ratio of about 1:4.

* * * * *